United States Patent [19]

Moran, Jr.

[11] Patent Number: 5,039,466
[45] Date of Patent: Aug. 13, 1991

[54] METHOD AND APPARATUS FOR MANUFACTURING PLASTIC COUPLINGS

[75] Inventor: Thomas F. Moran, Jr., Chagrin Falls, Ohio

[73] Assignee: Midwest Plastic Fabricators, Chagrin Falls, Ohio

[21] Appl. No.: 485,039

[22] Filed: Feb. 14, 1990

[51] Int. Cl.$^5$ ............................................. B29C 43/04
[52] U.S. Cl. .................... 264/150; 264/237; 264/296; 264/322; 425/393; 425/403; 425/397
[58] Field of Search ............ 425/392, 393, 403, 387.1, 425/297, 397, 112, 467, 469; 264/296, 322, 344, 534, 237, 573, 150

[56] References Cited

U.S. PATENT DOCUMENTS

| | | | |
|---|---|---|---|
| 3,495,301 | 2/1970 | Stephens | 425/392 |
| 3,599,287 | 8/1971 | Buck | 425/393 |
| 3,677,684 | 7/1972 | Platz | 425/393 |
| 3,732,054 | 5/1973 | Lyng | 425/469 |
| 3,773,456 | 11/1973 | Salz | 425/384 |
| 3,907,481 | 9/1975 | Heisler | 425/388 |
| 3,966,385 | 6/1976 | Spears | 425/393 |
| 4,015,923 | 4/1977 | Jarvinen | 425/393 |
| 4,107,249 | 8/1978 | Murai | 425/393 |
| 4,314,958 | 2/1982 | Macleod | 425/393 |
| 4,687,432 | 8/1987 | Cross | 425/387.1 |

*Primary Examiner*—Jay H. Woo
*Assistant Examiner*—Jeremiah F. Durkin, II
*Attorney, Agent, or Firm*—Pearne, Gordon, McCoy & Granger

[57] ABSTRACT

An apparatus and method for the manufacture of plastic couplings for joining together two lengths of plastic pipe. The couplings are manufactured from blanks of plastic material, such as polyvinyl chloride, which are heated to the thermoplastic state. The blanks are expanded between two mandrels which come together inside the ends of the blank. The mandrels have an outer member with a thin walled section and a nosepiece inside of that section which collapses at the end of the inward stroke of the mandrels so that the center shoulder of the coupling is not as wide as that of the prior art coupling. This results in a coupling which is shorter and lighter than the prior art coupling and yet is the full equivalent of the prior art coupling.

7 Claims, 5 Drawing Sheets

METHOD AND APPARATUS FOR MANUFACTURING PLASTIC COUPLINGS

SUMMARY OF THE INVENTION

This invention relates to an apparatus for manufacturing plastic couplings from heated thermoplastic blanks, on opposing mandrels, used for joining two lengths of plastic pipe together. It is an improvement on the apparatus disclosed in U.S. Pat. No. 4,623,506.

In accordance with my invention, I provide mandrels with a collapsing nosepiece so that the resultant coupling has a much narrower center shoulder and yet has the same socket depth for receiving the ends of the pipes to be joined together. The resultant coupling is thus shorter than the coupling of U.S. Pat. No. 4,623,506 and requires less plastic material so that it costs less and weighs less. It also allows the pipe ends, which it joins together, to be closer together after joining which facilitates wire pulling in the pipe.

DETAILED DESCRIPTION OF THE INVENTION

The couplings of the present invention may be made from various types of thermoplastic resins such as polyvinyl chloride (PVC) and acrylonitrile butadiene-styrene (ABS) resins. They are used to join the ends of two pipes or conduits of similar resins together. The ends of the pipes are inserted into sockets in the coupling and solvent cemented or otherwise attached to the coupling. The pipes are used in construction as conduits for electric wires or as pipes to conduct water or for many other uses as is well known in the art.

Prior to the invention of my U.S. Pat. No. 4,623,506, couplings of this type were injection molded from PVC or ABS resin. In that patent, we disclosed how to form couplings from heated thermoplastic blanks on opposing mandrels instead of making them by an injection molding process. The present invention is an improvement on the apparatus of U.S. Pat. No. 4,623,506.

Figure 1:
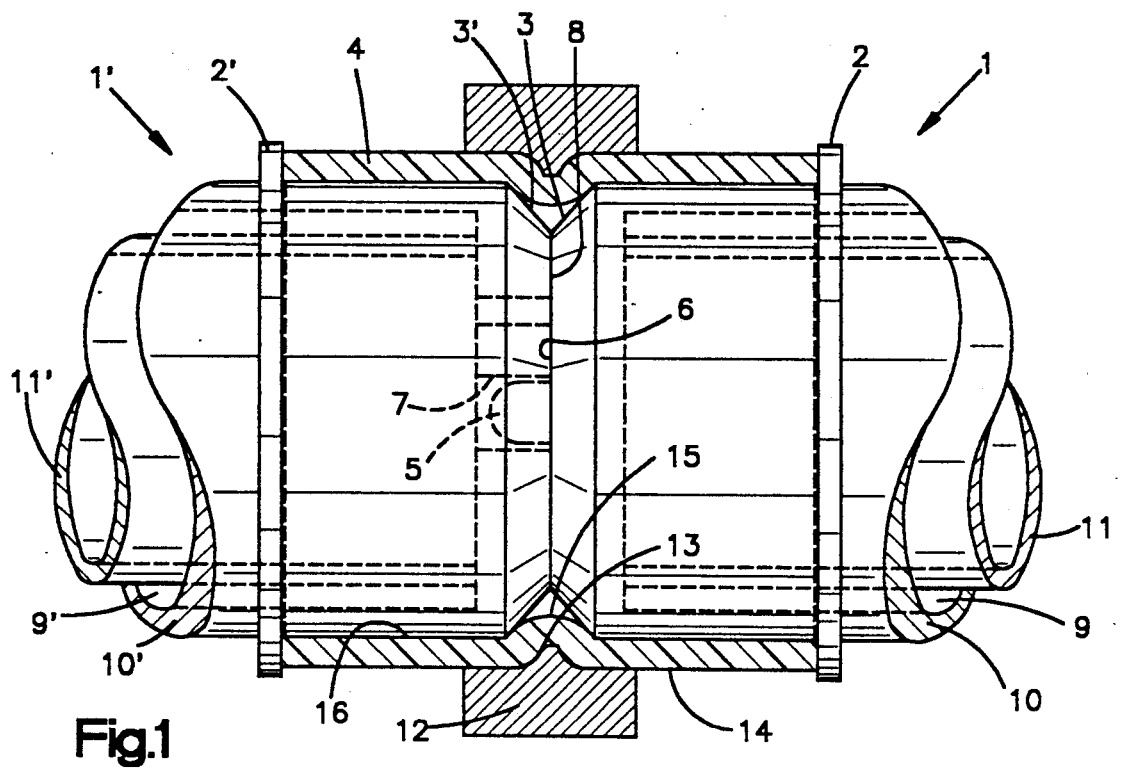
FIG. 1 is a cross-sectional view of the prior art apparatus of U.S. Pat. No. 4,623,506 showing the mandrels at the end of their stroke after having formed a coupling from a heated blank with a two piece, split die clamped around the center of the coupling.

FIG. 1 is a cross-sectional view of two of the mandrels 1 and 1' of U.S. Pat. No. 4,623,506 at the end of the inward stroke. The right hand mandrel 1 has a shoulder 2 and a conical nose portion 3 which engages the heated thermoplastic blank 4 and expands it as it moves inwardly toward the other mandrel. There is a nipple 5 in the center of the face 6 of the right hand mandrel which fits into a socket 7 in the face 8 of the left hand mandrel 1'. The mandrel is water cooled with water circulating in the space 9 between the outer mandrel section 10 and inner mandrel cylinder 11. The left hand mandrel 1' is constructed like the right hand mandrel 1 except for the socket 7 in the face 8.

Figure 8:
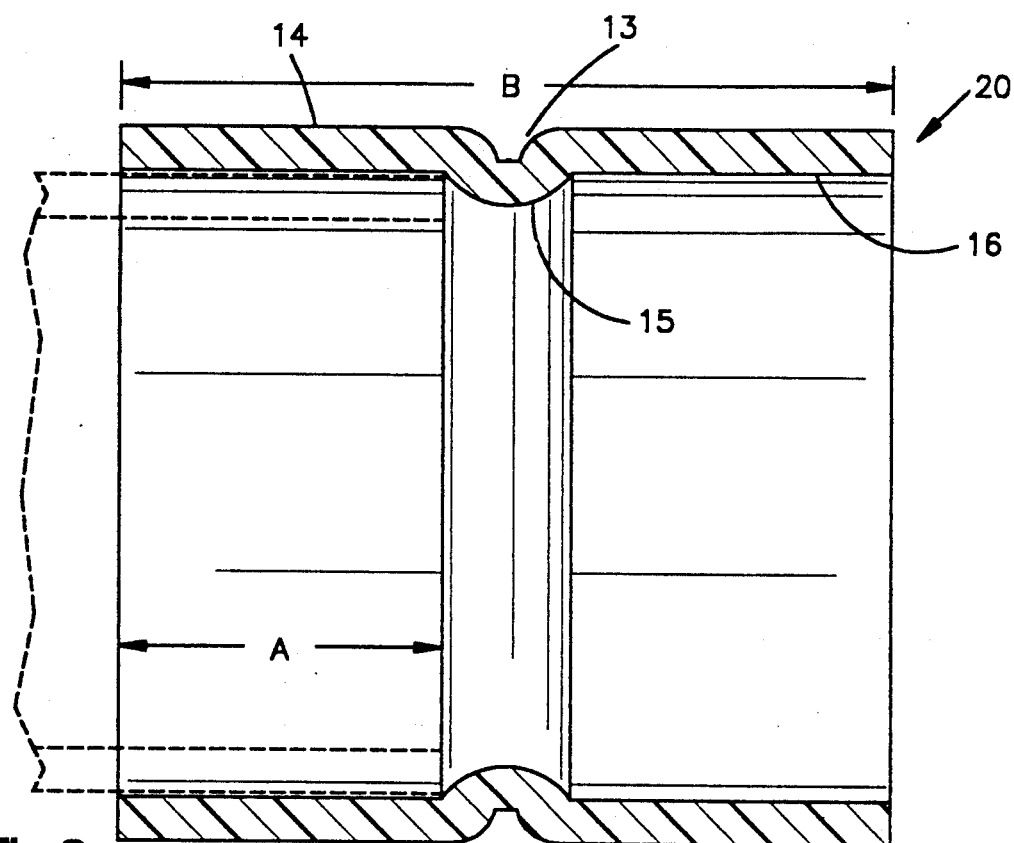
FIG. 8 is a cross-sectional view of a prior art coupling formed by U.S. Pat. No. 4,623,506.

In FIG. 1, the heated blank 4 has been expanded and formed into a coupling. The split die 12 is clamped around the middle of the blank 4 to form a circumferential groove 13 in its outer surface 14 and a circumferential shoulder or stop 15 in its inner surface 16. The prior art coupling 20 thus formed is shown in FIG. 8.

Figure 2:
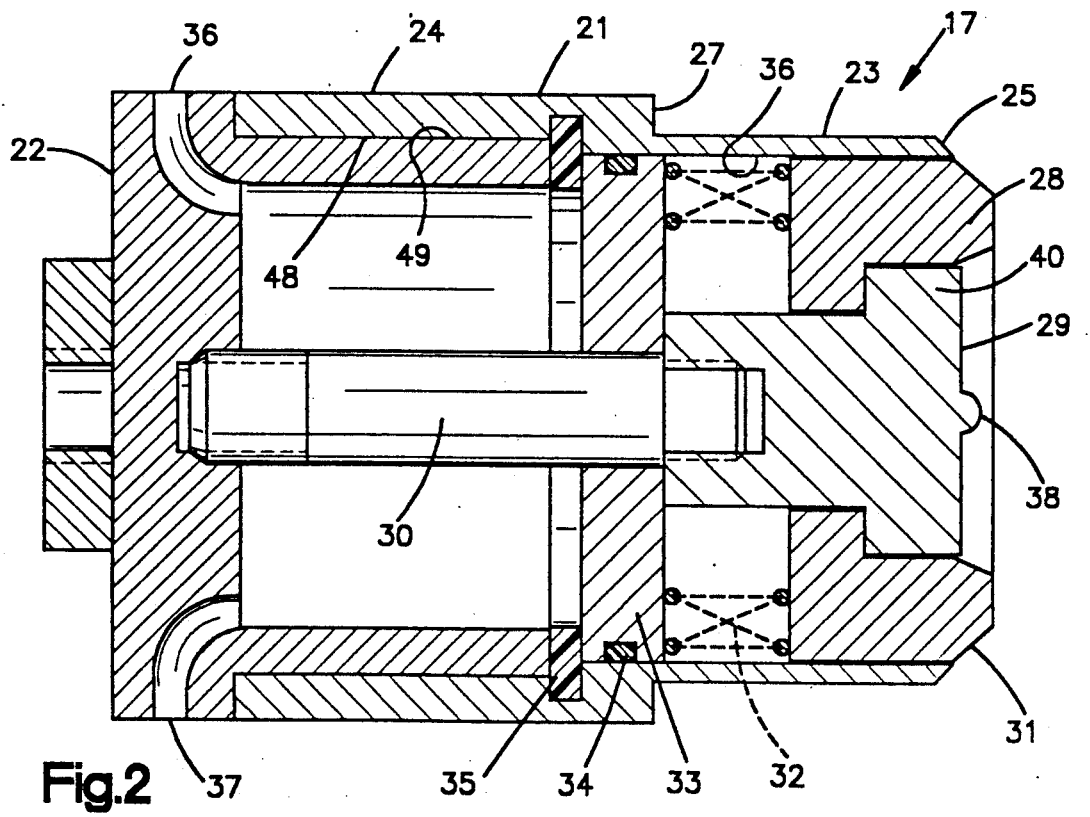
FIG. 2 is a cross-sectional view of a single mandrel with a collapsing nosepiece of the present invention.
Figure 4:
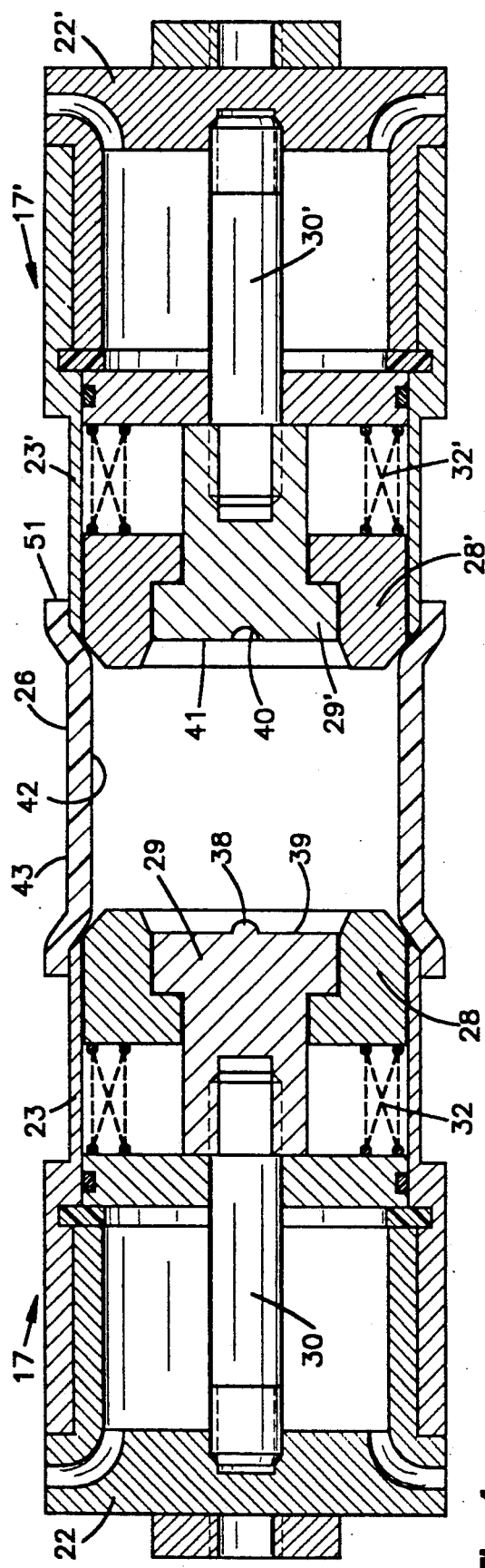
FIG. 4 is a cross-sectional view of two opposing mandrels engaging a heated thermoplastic blank between them as they expand the blank.

The mandrel 17 of the present invention is shown in FIG. 2. It comprises an outer cylindrical member or shell 21 which is mounted on the mandrel body 22 and is made up of a thin walled section 23 and a thick walled section 24. The thin walled section 23 of the outer member 21 extends away from the mandrel body 22 toward the blank and opposing mandrel 17' (FIG..3), and the thick walled section 24 of the outer member is mounted on the mandrel body 22. The thin walled section 23 has an angled leading edge or wedge portion 25 to engage the heated blank 26 after it has been expanded by the nosepiece 28, slip inside of its inside diameter, and continue with the process of the expansion of the blank. The angle of the leading edge 25 is about 45° sloping inwardly so that the edge can slip under the blank 26 as shown in FIG. 4. The blank 26 is heated to the thermoplastic point for the resin so that it can be permanently deformed. The junction between the thick walled section 24 and thin walled section 23 of the outer member 21 forms a shoulder 27 which engages the blank 26 and centers it as it is being expanded. The outer member 21 is preferably machined from one piece of aluminum so that it has good heat transfer and conductivity with the mandrel body 22. It is chrome plated to prevent wear and reduce friction.

The elements of the mandrel 17 inside the outer member 21 comprise a steel nosepiece 28 which collapses axially toward the mandrel body 22 inside of the thin walled section 23 of the aluminum outer mandrel member 21 and a steel facepiece 29 which is threaded onto a shaft 30 which is mounted in the mandrel body 22. The outer edge portion 31 of the nosepiece 28 is tapered inwardly at approximately the same 45° angle as the leading edge 25 of the outer shell 21. Four springs 32 hold the nosepiece 28 out away from a block 33 which in turn is mounted on the shaft 30. An "O" ring 34 effects a seal between the block 33 and the outer member 21. A gasket 35 effects a seal between the block 33 and the mandrel body 22 in cooperation with the outer member 21 as shown. The mandrel 17 is water cooled. Water enters through a port 36 and leaves through a port 37. The mandrel body 22 should be made of aluminum to facilitate the conduction of heat from the outer member 21. The inside surface 48 of the thick walled section 24 of the outer member 21 has a close press fit with the outside surface 49 of the mandrel body 22 so as to facilitate this heat transfer. With the arrangement shown, the cycle times for manufacturing product are about the same as with the apparatus of U.S. Pat. No. 4,623,506.

The left and right hand mandrels 17 and 17' (FIGS. 4–7) are identical except for the facepieces 29 and 29', respectfully. The facepiece 29 of the left hand mandrel 17 has a nipple 38 in its face 39 which fits into a socket 40 in the face 41 of the right hand mandrel facepiece 29'. The nipple 38 lines up the mandrels 17 and 17' as the forming stroke finishes its inward motion.

Figure 3:
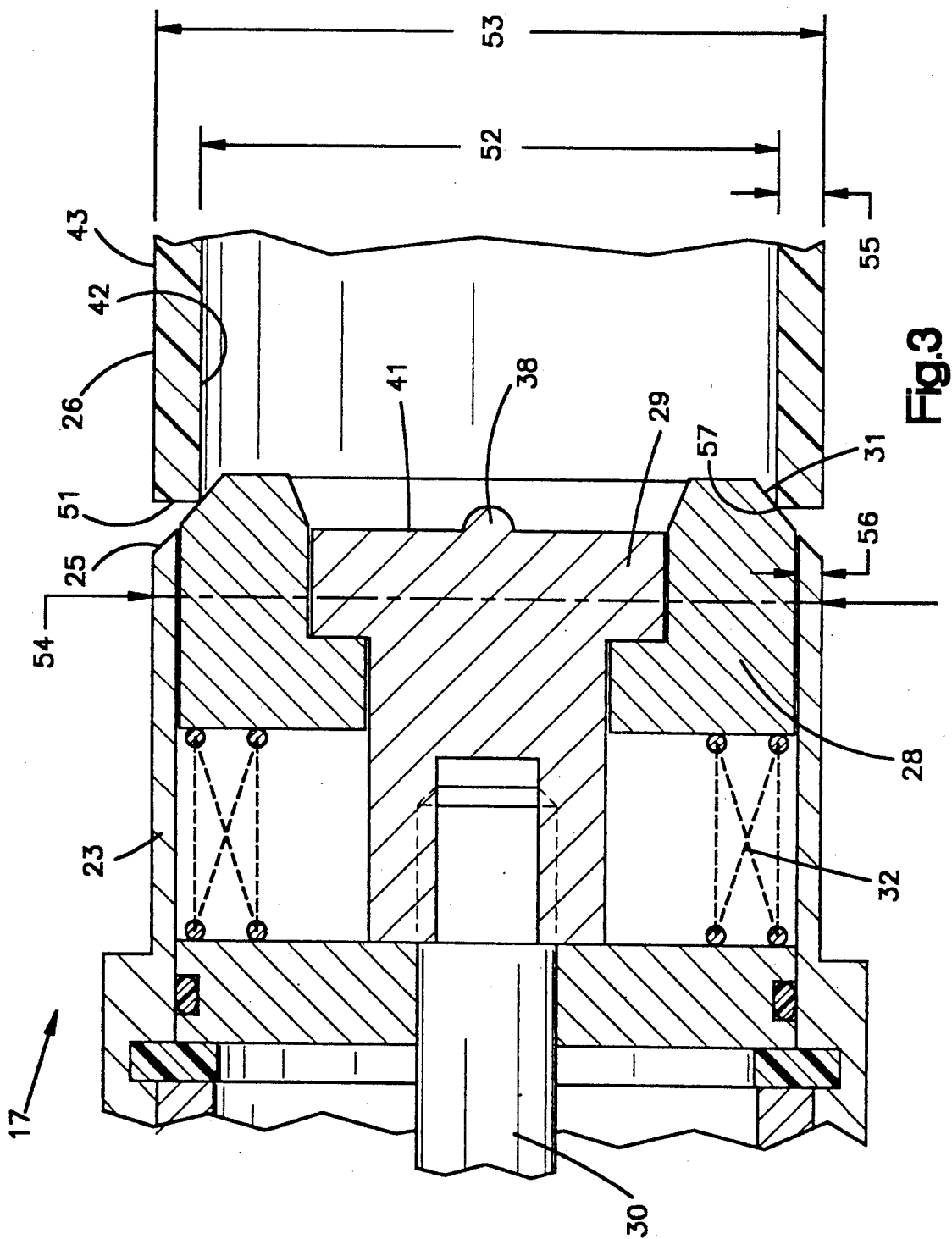
FIG. 3 is a cross-sectional view of portions of the single mandrel of FIG. 2 showing the relationship of the various parts of the mandrel to the blank at the beginning of the process.

As shown in FIG. 3, the end 51 of the blank 26 at its inside diameter 52 should contact the beveled outer edge portion 31 of the nosepiece 28 at the beginning of the forming process for expanding the blank. The springs 32 have to be strong enough keep the nosepiece in contact with the blank until the leading edge 25 of the thin walled section 23 of the outer member 21 has engaged the inside diameter 42 of the blank as shown in FIG. 4.

The outer diameter 53 of the blank 26 is about the same as the outer diameter 54 of the thin walled section 23 of the outer member 21. This is because the blanks are made from lengths of the pipe to be coupled together and the outside diameter of the pipe has to fit into the socket formed in the coupling.

In my process, the blank length shortens as the blank is expanded and the thickness tends to stay about the same. The relationships are such that if the thickness of the thin walled section 23 was enough to permit it to enter into the blank 26 without contacting the nosepiece 28, then the central shoulder of the resultant coupling would tend to be too large and the purpose of the invention would not be achieved. There would be no function for the collapsing nosepiece. The wall thickness of the thin walled section 23 should be less than the wall thickness of the blank 26 and the outside diameters should be substantially the same.

Figure 5:
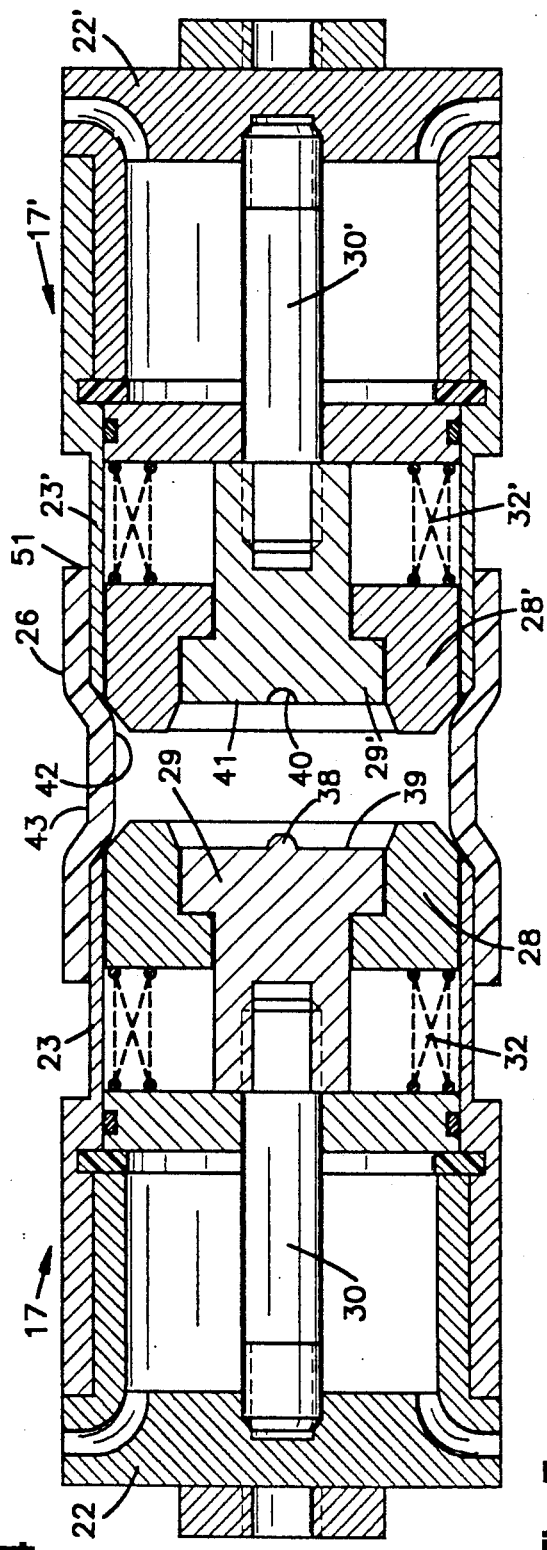
FIG. 5 is a cross-sectional view similar to FIG. 3 showing the two opposing mandrels approaching each other and further expanding the blank.
Figure 6:
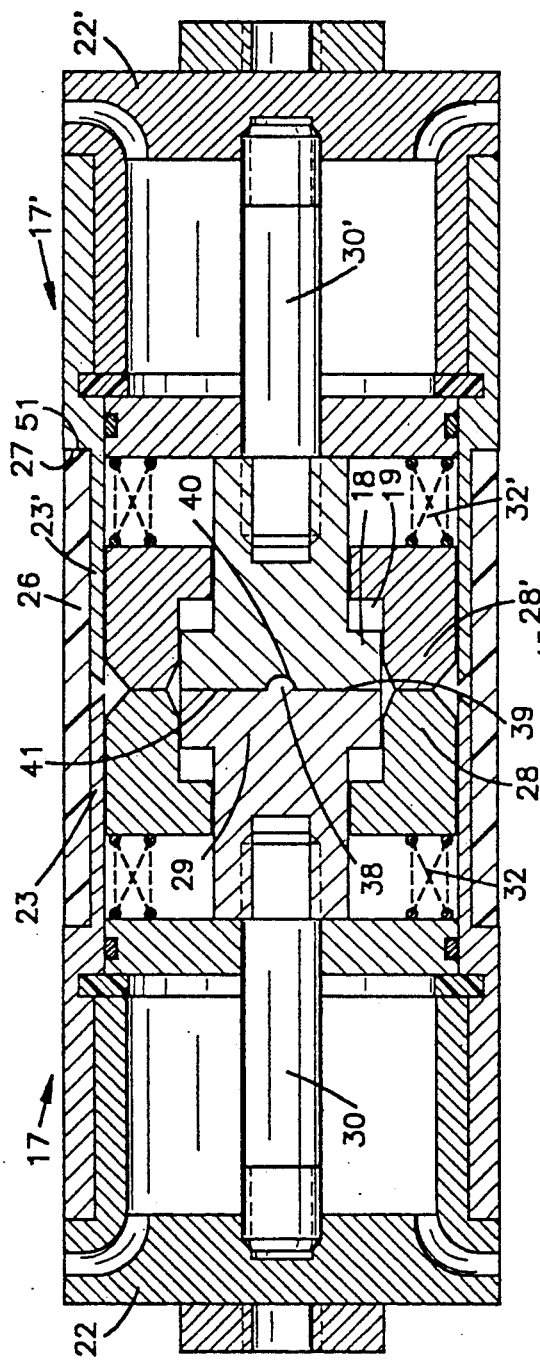
FIG. 6 is a cross-sectional view showing the two opposing mandrels at the end of their stroke with the faces of their center sections touching, with the blank fully expanded, and with the nosepieces collapsed.

The operation of the mandrels 17 and 17' is shown in FIGS. 4–7. In FIG. 4, the heated blank 26 is shown as the leading edges 25 and 25' of the outer members 21 and 21' of the opposing mandrels engage it and begin to come together to expand it with the leading edges 25 and 25' projecting inside of the inner diameter surface 42 of the blank 26. In FIG. 5, the operation is about half completed. In FIG. 6, the mandrels have come together and the faces 39 and 41 of the facepieces 29 and 29' touch and abut each other and stop the inward motion or stroke of the mandrels. The nipple 38 of the facepiece 29 has entered the socket 40 in face 41 of facepiece 29'. The nosepieces 28 and 28' have collapsed against their springs 32 and 32' into the outer shells 21 and 21'.

The stroke of the mandrels 17 and 17' is stopped by the facepieces 29 and 29'. These facepieces are made of steel. The facepieces 29 and 29' are screwed onto the shafts 30 and 30'. This provides the means whereby their touching or contact can be adjusted and controlled as necessary. The objective is to have the leading edges 25 and 25' of the outer members 21 and 21' almost but not quite touch or abut each other so that the middle section, or shoulder, of the coupling being formed has a very narrow ridge and groove. The thin walled sections 23 and 23' of the outer members 21 and 21' should be as thin as possible so as to minimize the width of the middle section of the coupling. I have found that outer members 21 and 21' work well when the thin walled sections 23 and 23' are only about 0.125 inch thick. This is thick enough to provide for rapid cooling and strong enough so as not to collapse from pressure from the shrinking action of the expanded thermoplastic blank. Cooling water continuously circulates through the mandrel bodies thus cooling the outer member 21 and the heated blanks. It is thin enough to allow the beveled ends 25 and 25' to nearly join together and provide the narrowest possible gap which forms the coupling shoulder. Each of the facepiece 29 and 29' has a collar portion 48 (FIG. 6) which fits inside of a socket 49 and 49' formed in the nosepiece 28 and 28' to provide the means to hold the nosepiece in place.

The various parts of the mandrels 17 and 17' are circular in cross-section because the couplings being formed are circular in cross-section. The outer diameter 23 of the outer member 21 corresponds to the outer diameter of the pipe to be joined together by the coupling. If it is a 4" coupling for 4" pipe, then the outer diameter of the section 23 of the outer member 21 should be about 4½". A 4" pipe means that the inner diameter is 4" and the outer diameter is about 4½". The mandrels do have a taper with the base of the mandrel being slighter larger in diameter than the end with the nosepiece. This provides for a taper in the finished product which is desirable to compensate for variations in pipe diameter while providing an interference fit which is desirable for solvent joining.

The blank 26 is centered between the mandrels by the shoulders 27 and 27' of the outer members 21 and 21'. The distance between the shoulders 27 and 27' determines the length of the coupling being formed.

Figure 7:
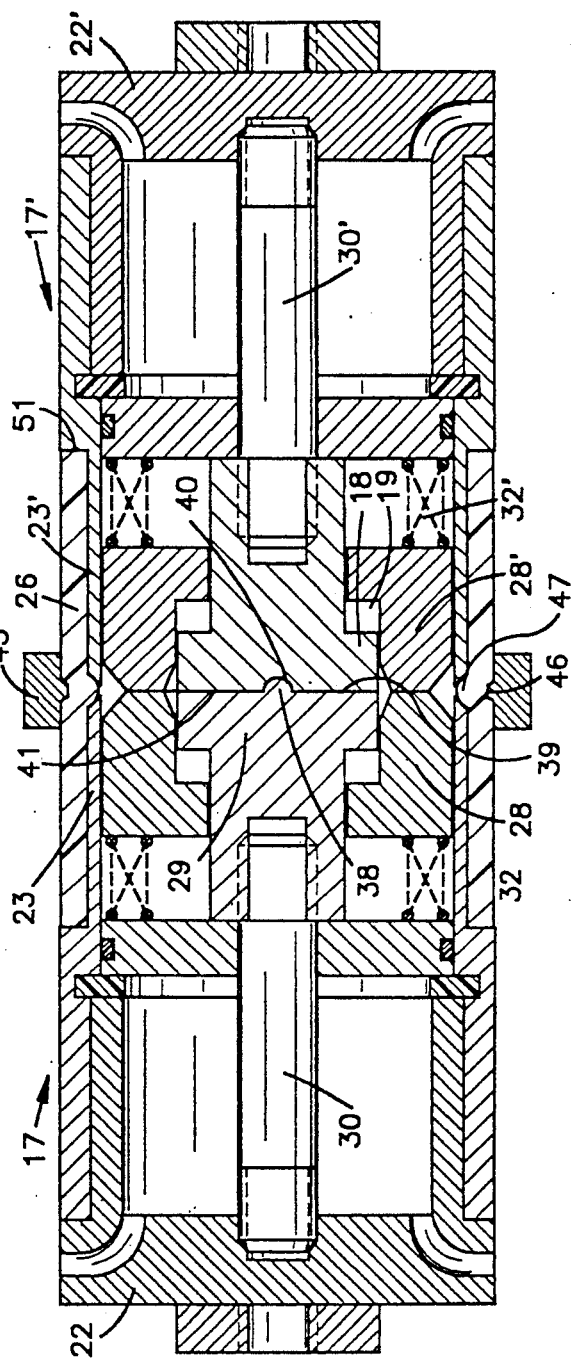
FIG. 7 is a cross-sectional view similar to FIG. 6 with the split die clamped around the middle section of the blank to form an outside groove and inside ridge in the expanded blank.

FIG. 7 shows the last stage of the process. A piloted split die 45 clamps over the middle section of the blank 26 and forms a groove 46 in the outer surface 43 of the blank and a shoulder or stop 47 in the inner surface 42 of the blank.

Finally, ending the forming process, the mandrels 17 and 17' are withdrawn while the split die 45 acts as a striper and holds the blank 26. After the mandrels have withdrawn, the split die opens up and the coupling 50 thus formed is dropped into a bath of cooling water where the cooling process is finished.

The means for moving the mandrels toward and away from each other are preferably hydraulic cylinders with pistons which connect to the bodies 22 and 22' of the mandrels. The split die 45 is programmed and co-ordinated with the movement of the mandrels to grasp and hold the blank as described. The movement of the split lies is via hydraulic cylinders mounted perpendicular to the cylinders on which the mandrels are mounted. The split dies have a provision for mounting engraved print dies in them which press against the outside surface of the heated blank. The print die embosses useful information such as size of the coupling, company name and specification information.

Figure 9:
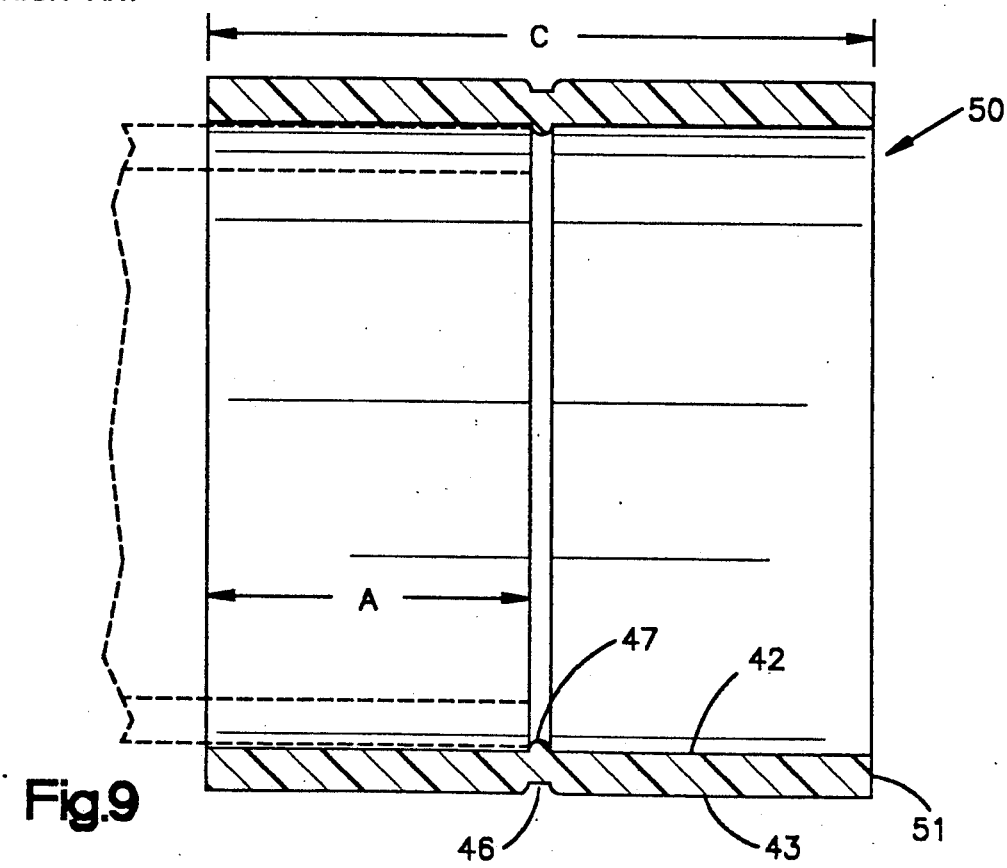
FIG. 9 is a cross-sectional view of a coupling formed by the present invention.

The coupling 50 is shown in FIG. 9. This coupling has a narrower groove and shoulder section compared to the prior art coupling 20. This length C of the coupling 50 of my invention is less than the length B of the prior art coupling 20. The wall thickness is the same. The socket depth A for each coupling is the same and thus the socket for receiving the ends of the pipe or conduit, shown in phantom in FIGS. 8 and 9, is the same for both couplings. The taper of the inside diameter of the sockets is the same.

Comparing the couplings, the shoulder or stop 15 of the prior art coupling 20 is much wider than the shoulder 47 of the coupling 50 of my invention. Likewise, the groove 13 of the prior art coupling 20 is deeper and wider than the groove 46 of the coupling 50 of my invention.

As shown in phantom in FIGS. 8 and 9, the ends of the pipe abut against the ridges or stops 13 and 47 and extend the same distance into the coupling, however the ends are closer to each other when bottomed out on the shoulder of the new coupling which facilitates pulling wires through the pipe when used as a conduit.

The Table I below gives some idea of the advantages of the present invention. In the table, the weights and lengths for the prior art and new couplings made of PVC resin for the same sizes are compared.

TABLE I

| Size (Nominal Inside Diameter of Conduit) | | Length (In Inches) | Weight (In Pounds) |
|---|---|---|---|
| 2" | old | 3¼ | .187 |
|  | new | 2⅞ | .151 |
| 2½" | old | 4 | .367 |
|  | new | 3 7/16 | .315 |
| 3" | old | 4⅜ | .525 |
|  | new | 3⅞ | .465 |
| 3½" | old | 4¾ | .685 |
|  | new | 4 | .576 |
| 4" | old | 4 13/16 | .823 |
|  | new | 4¼ | .729 |
| 5" | old | 5⅞ | 1.33 |
|  | new | 5¼ | 1.218 |
| 6" | old | 6 | 1.8 |
|  | new | 5⅞ | 1.61 |

In general, there is a weight saving of at least about ten percent. In the above table, "old" means the prior art coupling of FIG. 8 and "new" means the coupling of FIG. 9.

In order to make a four inch coupling by the old process, the blank had to be 4 13/16 inches long. In order to make a four inch coupling by the new process, the blank needs to be only 4¼ long. In each case, the coupling has a 2 inch long tapered socket on each end to receive the ends of the conduit being joined together. The thickness is substantially the same.

Air is not trapped between the inner surface of the blank and the face of the opposing mandrels as they come together because the mandrels are a three piece assembly instead of one piece as in FIG. 1 and the air can readily escape. Some air pressure does build up, but not too much.

Because the outer shell 21 is made of aluminum, it conducts enough heat from the blank to enable the mandrels to operate at cycles approximately the same as those of U.S. Pat. No. 4,623,506.

The features of the present invention are thus a mandrel 17 with an outer member 21 with a thin walled section 23 with a tapered leading edge 25 to slide under the heated blank after initial expansion by the nosepiece 28, a collapsing inner nosepiece 28 with a tapered outer edge portion 31 corresponding in taper angle of the leading edge 25 of the outer member, a fixed facepiece 29 which limits the stroke of the mandrel and restrains or holds the nosepiece 28, and means such as springs 32 to keep the nosepiece out away from the mandrel body until the end of the stroke.

This patent is not to be limited in scope and effect to the specific embodiment herein shown or in any other way which is inconsistent with the extent to which the progress of the art has been advanced.

What is claimed is:

1. A method of forming couplings for joining two lengths of pipe together comprising the steps of:
   cutting extruded thermoplastic pipe into blanks of appropriate length and heating the blanks to the thermoplastic state:
   disposing one of the blanks between two mandrels having substantially the same outer diameter as the outer diameter of the lengths of pipe to be coupled together;
   bringing the mandrels together in an inward stroke at a relatively uniform force and rate to cause inner nosepiece portions of the mandrels to first contact the ends of the blanks and begin to expand the ends of the blank and then to cause the inner nose piece portions to collapse inside of outer thin walled sections of outer members of the mandrel which continue to expand the blank at the end of the inward stroke;
   capturing the blank in a split die to form a circumferential shoulder in the inner surface of the blank;
   withdrawing the mandrels in an outward stroke while the split die holds the blank thus formed; and
   releasing the blank from the split die and dropping it into a bath of cooling water.

2. A mandrel assembly for the manufacture of plastic couplings from heated thermoplastic blanks in a forming process comprising:
   two opposing mandrels;
   means for moving the mandrels together and apart from each other;
   a split die for grasping the middle of an expanded heated blank when the mandrels are together and forming a circumferential groove in the outer surface of the blank and a circumferential rib in the inner surface of the blank;
   each mandrel having
   a. a body,
   b. an outer member with a thin walled section having an inwardly beveled leading edge adapted to expand the blank to a desired inner diameter, said thin walled section terminating in a shoulder for centering the blank on the mandrel, said outer member being mounted on the mandrel body,
   c. a nosepiece inside the thin walled section of the outer member which has a beveled edge portion for engaging the blank at the beginning of the inward stroke,
   d. a central inner facepiece inside of the nosepiece which abuts and stops against a central facepiece of the other mandrel at the end of the inward stroke; and
   e. means to hold the nosepiece outwardly from the mandrel body when it first engages the blank and to permit it to collapse toward the mandrel body at the end of the inward stroke.

3. The mandrel assembly of claim 2 in which the outer member is made of aluminum and the mandrel body has water cooling means which cools the thin walled section of the outer member.

4. The mandrel assembly of claim 2 in which the outer diameter of the thin walled section of the outer member is substantially the same as the outer diameter of the blank being formed and the thickness of the wall of the blank being formed is greater than the thickness of the wall of the thin walled section of the outer member.

5. The mandrel assembly of claim 2 in which a facepiece is screwed onto a shaft mounted on the mandrel body wherein said faceplate is adjustable to prevent the beveled edge portions from contacting each other at the end of the inward stroke but permit them to come very close to each other.

6. The mandrel assembly of claim 2, in which the means to hold the nosepiece outwardly from the mandrel body comprises springs which are disposed between the block which is mounted in said outer member and the backside of the nosepiece.

7. The mandrel assembly of claim 2 in which the angles of the beveled leading edges of the thin walled section of the outer members and the angles of the beveled edge portions of the nosepieces are substantially the same.

* * * * *